April 19, 1938.　　　　M. D. ALBRECHT　　　　2,114,413
METHOD FOR MAKING CROSS LINKS FOR TIRE CHAINS
Filed Aug. 13, 1937
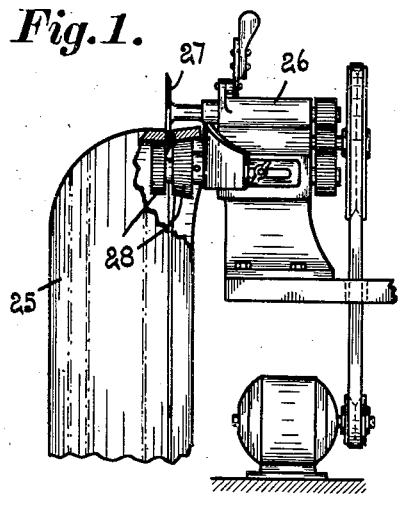
Fig.1.
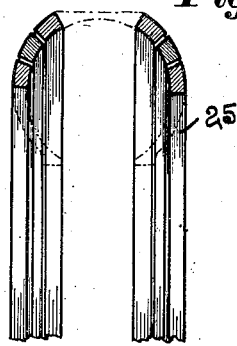
Fig.2.
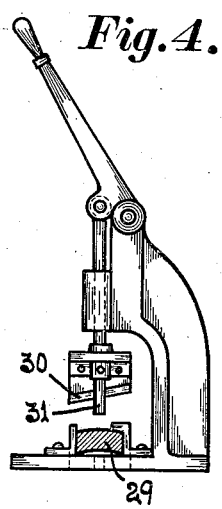
Fig.4.
Fig.3.
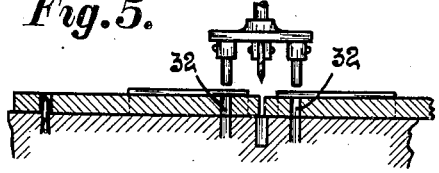
Fig.5.
Fig.6.
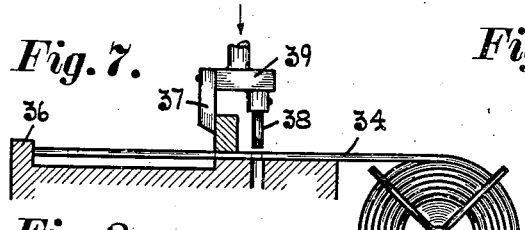
Fig.7.
Fig.9.
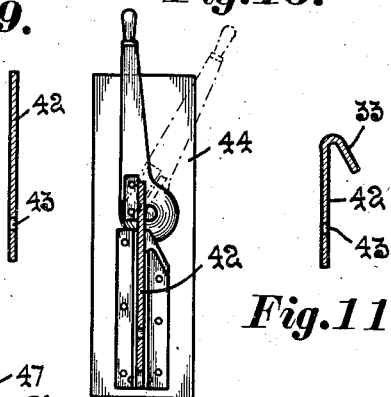
Fig.10.
Fig.8.
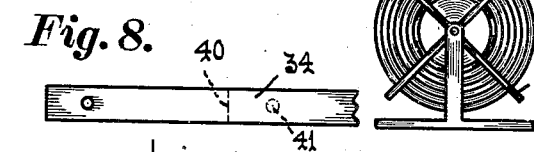
Fig.11.
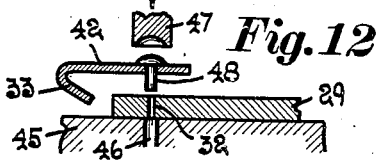
Fig.12.
Fig.13.
Fig.14.
Inventor
M. D. Albrecht
By Arthur H. Sturges
Attorney Patented Apr. 19, 1938

2,114,413

UNITED STATES PATENT OFFICE 2,114,413

METHOD FOR MAKING CROSS LINKS FOR TIRE CHAINS

Michael D. Albrecht, Omaha, Nebr.

Application August 13, 1937, Serial No. 158,922

3 Claims. (Cl. 152—14)

The present invention relates to a method and product for the manufacture and construction of anti-skid devices for automobile tires made from worn out tires or casings, thus to fully utilize all of the unworn sections of tires for the production of a new commodity for application to tires.

An object of the present invention is to construct cross links or members for application to the treads of tires, from the intermediate lateral portions of the tire casings. These particular portions of the tire casings are usually subject to but little wear during the entire life of a tire and consequently the material and tire construction at these points is substantially uniform and in good wearing condition after the tread and side wall portions of the tire have been worn or broken through.

Another object of the invention is to provide a novel and simplified method or series of steps for the recovering of the usable sections of old tire casings and the subsequent cutting and treatment and adding thereto the necessary hooks and other parts for the production of a cross link for a tire chain readily and quickly applicable to the usual side chains.

Another object of this invention is to provide a cross link for tire chains which possess the same characteristic structure of canvas layers and interposed rubber or other composition layers, similar and identical to the tire to which the cross link is applied so that the cross link when in position is free to flex and become practically a wall portion of the tire partaking of all of the deforming movements thereof incident to load and other pressures imposed on the tire during use.

With the foregoing and other objects in view, the invention will be more fully described hereinafter, and will be more particularly pointed out in the claims appended hereto.

In the drawing, wherein like symbols refer to like or corresponding parts throughout the several views.

Figure 1 is a side elevation of a tire cutting tool, showing a discarded tire casing in position thereon for severing the casing into circumferential strips.

Figure 2 is a detail fragmentary view of the opposite casing parts after the initial cutting operation.

Figure 3 is a fragmentary plan view of one of the strips cut from the tire casing.

Figure 4 is a sectional view taken through a combined cutter and punch showing the tire strip in position thereon ready to be cut into lengths and provided with receiving holes.

Figure 5 is a side elevation of the same showing the tire strip in position subsequent to punching and severing into sections of desired lengths.

Figure 6 is a top plan view of the completed strips.

Figure 7 is a sectional view showing a combined cutting and punching device for making hook strips from the blank strip shown.

Figure 8 is a top plan view of the strip, the dotted lines showing the line of severance and the punch hole to be accomplished by the machine of Figure 7.

Figure 9 is a detail longitudinal section taken through one of the hook strips after cutting and punching.

Figure 10 is a plan view of a bending machine having the hook strip applied thereto, the dotted lines showing the direction of operation of the machine for forming a hook on one end of the strip.

Figure 11 is a longitudinal sectional view taken through the combined hook strip.

Figure 12 is a sectional view taken through a rivet machine having the tire strip and hook strip in relative positions with a rivet ready for assembly.

Figure 13 is a similar view but showing the final operation of riveting the hook strip on the tire strip, and Figure 14 is a perspective view of the finished cross link with one end secured to a side chain.

Referring now to the drawing which illustrates the various steps and devices for carrying out the steps of this method, a worn or discarded tire casing 25 is applied to a cutting machine 26, shown in Figure 1, which has a disc cutter 27 opposite which is disposed opposing rolls 28. The rolls 28 are adapted to engage the inner side of the tire casing 25 while the disc 27 operates against the outer side of the casing so that as the rolls 28 and the cutting disc 27 are rotated the casing 25 is carried over the rolls 28 and between the same and the cutter 27 so as to provide a circumferential cut in the casing. This operation is repeated a desired number of times so as to obtain a desired number of circumferential strips out of the best portions of the tire casing, as shown in Figure 2. It will be noted that the best portions of the casing, after considerable use, are at the zones defined between the tread portion of the tire and the side walls thereof. After the cutting of the tire into strips or lengths, the lengths are severed in any suitable manner to provide tire strips 29 of a length dependent upon the size and condition of the tire which is cut. The tire strip 29 is now placed upon a suitable machine or tool having a cutter 30 adapted to sever the strip 29 into lengths of desired size. The machine is also provided with a pair of spaced apart punches 31 adapted to cooperate with the cutter 30 so as to punch rivet holes 32 in the opposite end portions of the lengths of the strip 29.

The tire strip 29, when punched and cut to the desired length is provided with attaching hooks 33 at opposite ends. Each hook 33 is formed from a metallic strip 34 which may be carried upon a reel 35, as shown in Figure 7, the strip being passed through a combined cutter and punch and which is provided with a stop 36 against which the end of the strip 34 is adapted to abut for determining the desired length of the hook strip which is cut from the metal strip or band 34. As shown in Figure 7 the cutter 37 and the punch 38 are mounted upon a common head 39. The cutter 37 cuts off a previously punched hook strip to free it while the punch 38 forms a rivet hole in the adjacent end of the band 34. When the head 39 is then raised the band 34 is advanced beneath the cutter 37 and the punch 38 to an extent limited by the stop 36 so that the hook strips are of uniform length. Of course, the length is dependent upon the size of the cross link being manufactured.

The band 34 is shown in top plan view in Figure 8 where the dotted line 40 illustrates the point of severance by the cutter 37 and the dotted line 41 shows the position of the rivet hole which is punched in the adjacent end of the band 34 as the outer end thereof is cut off to the desired length. In Figure 9 the hook strip 42 is shown in section as provided with a rivet hole 43, after having been cut and punched according to Figure 7. This strip 42 is placed in a bending machine 44 with its imperforate end in position for bending. After operation in the machine 44 the hook strip is overturned upon itself to provide a hook 33 as shown in Figure 11. In Figure 12 the tire strip 29 is placed upon an anvil or table 45 with the rivet receiving opening 32 in register with an opening 46 in the anvil 45 and the cavity of a punch 47. The hook strip 42 is provided with a rivet 48 inserted inwardly through the opening 43 thereof and in such position that the hook 33 extends downwardly toward the anvil and the head of the rivet 48 is disposed beneath the punch 47. The punch 47 is now lowered so as to drive the rivet 48 through the opening 32 in the tire strip 29, whereupon the assembled tire and hook strips are riveted upon the anvil 45 after placing a washer 50 over the rivet and the punch 47 is then brought down to rivet or upset the end of the rivet 48 to secure the two strips together. Thus, as shown in Figure 14 the completed cross link comprises a relatively narrow and thin section of tire embodying all of the structural and functional characteristics thereof, and the strip has riveted upon each end thereof a hook 33 of suitable size adapted to be engaged through a link of an adjacent side chain 49. The hooks 33 are adapted to be bent back upon the strips 42 for closing the hooks about the link of the side chain to firmly hold the cross link from accidental separation from the side chains when the tire is flexed and when the link and side chains are slackened.

It is obvious that various changes and modifications may be made in the details of construction and design of the above specifically described embodiment of this invention without departing from the spirit thereof, such changes and modifications being restricted only by the scope of the following claims:

What is claimed is:

1. The method of making tire chain cross links of worn tires, which consists in cutting circumferential strips from the lateral tread portions of used tires, cutting said strip in desired lengths, and securing hooks to the opposite ends of the cut strips.

2. The method of making tire chain cross links from waste tires, which consists in cutting annular circumferential rings from waste tires at the portions thereof between the tread and the side walls, cutting said rings into tire strips of desired length and punching rivet openings through the opposite end portions thereof, cutting short strips from strip metal stock and punching rivet openings in one end portion thereof, bending the other end portions of the short metal strips to form hooks thereon, and assembling and riveting through said rivet openings a hooked metal strip on each end of each of said tire strips.

3. That method of making cross links for tire chains from waste tires, which consists in cutting circumferential strips from the lateral tread portions of old tires, cutting said strips to lengths and punching rivet holes in the lengths adjacent the ends thereof, cutting hook strips of desired length from a stock metal strip and punching a rivet hole in one end of each metal strip length, bending the other end of each strip length into a hook, and riveting the tire and metal strip lengths together in overlapping relation with a hook extending from each end of the tire strip for mounting in a tire chain.

MICHAEL D. ALBRECHT.